US012584834B1

(12) United States Patent (10) Patent No.: US 12,584,834 B1
Kowalewski et al. (45) Date of Patent: Mar. 24, 2026

(54) METHOD FOR PREPARING AN INJECTABLE PLASMA GEL FROM A SAMPLE OF CENTRIFUGED BLOOD

(71) Applicant: PRP TECHNOLOGIES INC, San Carlos, CA (US)

(72) Inventors: Ryszard Kowalewski, Vancouver (CA); Marcin Kowalewski, Calgary (CA)

(73) Assignee: PRP TECHNOLOGIES INC, San Carlos, CA (US)

( * ) Notice: Subject to any disclaimer, the term of this patent is extended or adjusted under 35 U.S.C. 154(b) by 0 days.

(21) Appl. No.: 19/170,672

(22) Filed: Apr. 4, 2025

(51) Int. Cl.
*G01N 1/44* (2006.01)
*G01N 1/40* (2006.01)
(52) U.S. Cl.
CPC ............. *G01N 1/44* (2013.01); *G01N 1/4077* (2013.01)
(58) Field of Classification Search
None
See application file for complete search history.

(56) References Cited

FOREIGN PATENT DOCUMENTS

CN 119320423 A * 1/2025 ............. C07K 1/145

OTHER PUBLICATIONS

CN 119320423 A—English Translation (Year: 2025).*

* cited by examiner

*Primary Examiner* — Elizabeth A Robinson
*Assistant Examiner* — Brittany I Fisher
(74) *Attorney, Agent, or Firm* — Jonathan D Feuchtwang

(57) ABSTRACT

A method for preparing an injectable plasma gel from a sample of centrifuged blood, comprising: provide a collection tube containing a sample of whole blood. Centrifuge and then heat the collection tube to create an upper layer of denatured plasma and a lower layer of denatured red blood cells. Providing an assembly including a syringe (or a syringe and a transfer tube attached to it) and a tube seal mounted on the distal end of the syringe, and the tube seal having an outer diameter which closely approximates the inner diameter of the tube. Inserting the distal end of the assembly into the heat resistant collection tube such that the tube seal abuts the layer of plasma gel. Advancing the assembly into the collection tube until all of the plasma gel layer is transferred into the hollow interior of the syringe barrel.

8 Claims, 7 Drawing Sheets

CENTRIFUGE A BLOOD
COLLECTION TUBE CONTAINING
A SAMPLE OF WHOLE BLOOD — 100

WHOLE BLOOD
SEPARATES INTO A
LAYER OF
LIQUID PLASMA & A
LAYER OF LIQUID RBC

ASPIRATE THE LIQUID PLASMA LAYER
USING A HEAT RESISTANT SYRINGE
WITH A NEEDLE — 102

HEAT THE SYRINGE WITH
LIQUID PLASMA TO CREATE
PLASMA GEL — 104

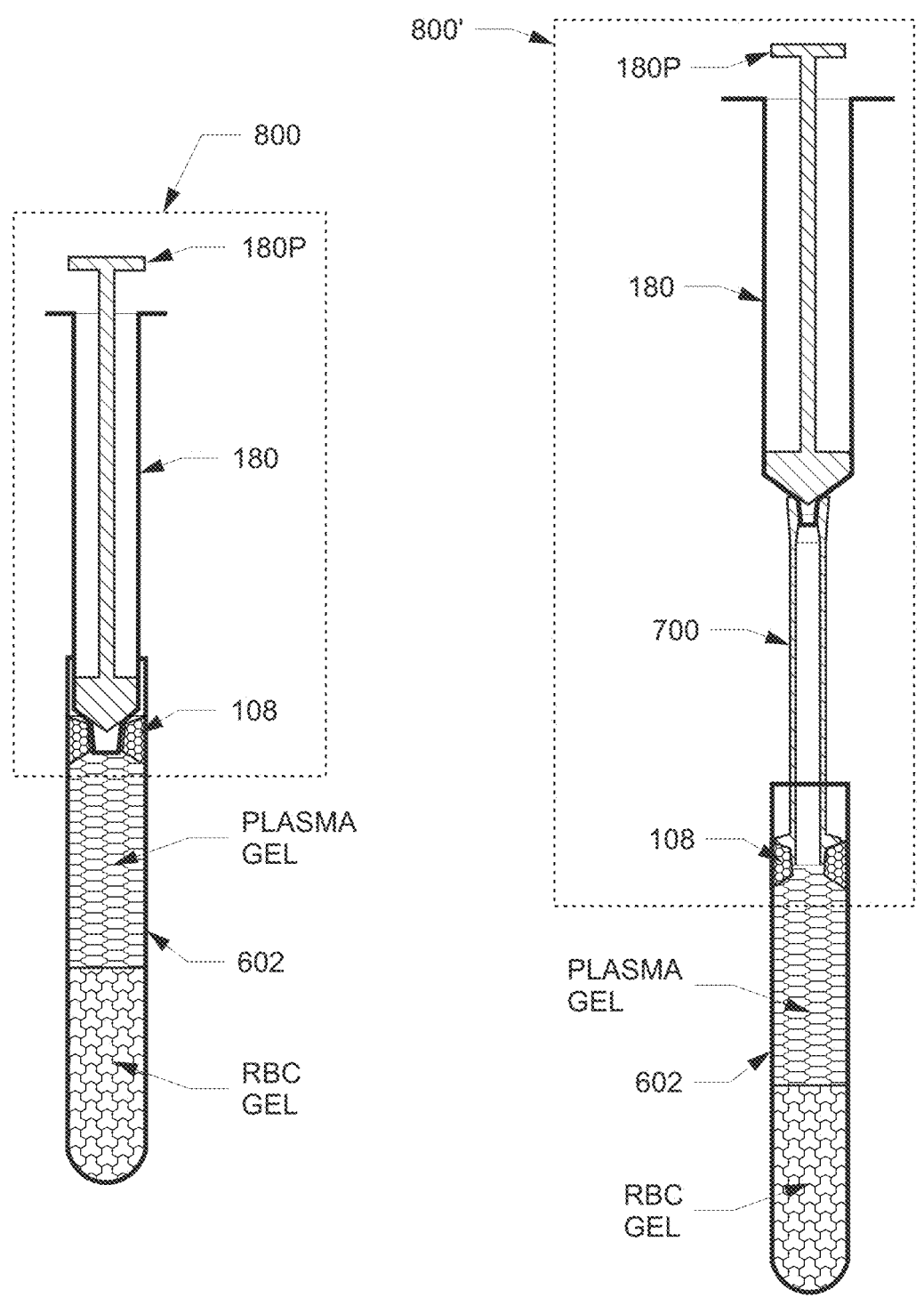
FIG. 9A                    FIG. 9B

METHOD FOR PREPARING AN INJECTABLE PLASMA GEL FROM A SAMPLE OF CENTRIFUGED BLOOD

FIELD OF THE INVENTION

The present invention relates to methods of preparing an injectable plasma gel from a sample of centrifuged blood.

BACKGROUND OF THE INVENTION

Creating a gel from a sample of plasma is known in the art and will now be explained with reference to FIG. 1. Such a method starts with centrifuging a sample of blood in a collection tube (step 100) such that the sample of whole blood is separated into its constituent components; namely, a layer of liquid plasma and a layer of liquid red blood cells. The liquid plasma layer is then removed from the collection tube (step 102). The removal may be accomplished using a conventional syringe 180 (FIG. 5) having a barrel and a plunger 180P movably seated within the barrel. The syringe barrel is generally cylindrical and has a hollow interior for accommodating the plunger. The proximal end of the barrel has an enlarged opening and the distal end of the barrel tapers to a narrow opening 180T. One or more flanges or finger grips are provided on an exterior surface of the barrel near the proximal end.

The distal end 180T of the barrel may be equipped with a Luer taper.

The plunger 180P is an elongated member having an enlarged thumb rest at a proximal end and a sealing member on a distal end thereof. The sealing member is resilient and is sized to have an interference fit with the interior wall of the barrel. As the plunger 180P is advanced into the hollow interior of the barrel, anything housed in the hollow interior of the barrel is pushed by the sealing member towards the narrow opening at the distal end 180T of the barrel. Correspondingly, retracting the plunger 180P within the hollow interior of the barrel creates suction (negative pressure) which pulls fluids or the like which are near the narrowed opening of the barrel into the hollow interior of the barrel.

In the context of the conventional method for creating gel, a conventional syringe 180 is used to aspirate the plasma from the tube. Typically, the syringe has a needle attached to its tip which is inserted into the collection tube containing the centrifuged sample of whole blood such that the needle contacts the plasma. The plasma is then syphoned (aspirated) into the syringe through a needle by retracting the plunger 180P.

Plasma is gelled (denatured) by application of heat (step 104). In the conventional method (FIG. 1) the syringe containing the plasma must be created from heat-resistant materials which will not leach out or off-gas and contaminate the plasma. The liquid plasma is denatured and gelled by heating the syringe containing the plasma to between 167 degrees Fahrenheit and 212 degrees Fahrenheit (between 75 and 100 degrees Celsius) for 5-20 minutes. The plasma gel is significantly more viscous than liquid plasma and can't be aspirated by a syringe.

The conventional method requires aspiration of the liquid plasma from the centrifuged collection tube, into the heat-resistant syringe through a needle. The heat resistant syringe is typically made of glass or heat resistant plastics. There exist blood collection tubes for PRP, liquid PRF, and solid PRF, but there are no FDA approved tubes for plasma gel. The reason why there are no tubes for plasma gel, is because gelled (denatured) plasma is significantly more viscous than plasma which has not been denatured. Denatured plasma cannot be transferred from a tube using a syringe by means of aspiration alone because the gelled plasma is too dense to flow into the syringe. This problem cannot be addressed practically by adjusting the size of the syringe, as gels resist flow using negative-pressure displacement methods. A syringe is therefore incapable of aspirating a dense gel with a satisfactorily high recovery rate without aspirating a lot of air and also the undesired gelled red blood cells. The present invention unexpectedly overcomes the shortcomings of the prior art by using the tube seal and positive pressure to displace the volume of plasma gel from tube into the syringe. Further, the present invention also eliminates needles from the transferring process, and hence improving safety to the operator.

SUMMARY OF THE INVENTION

Example 1: A method for preparing an injectable plasma gel from a sample of centrifuged blood, comprising:

provide a heat resistant tube containing a sample of whole blood which has been centrifuged to form a plasma layer and a red blood cell layer, the heat resistant tube having an inner diameter;

heating the heat resistant tube to between 167 degrees Fahrenheit and 212 degrees Fahrenheit for 5-20 minutes creating a layer of denatured plasma and a layer of denatured red blood cells;

providing an assembly 800 including:

a syringe having a barrel and a plunger movably seated within the barrel, the barrel is generally cylindrical and has a hollow interior for accommodating the plunger, a proximal end of the barrel has an enlarged opening and a distal end of the barrel tapers to a tip having a lumen in fluid communication with the hollow interior, the plunger at least partially inserted into the barrel of the syringe; and a tube seal mounted on the distal end of the barrel, the tube seal having an outer diameter which closely approximates the inner diameter of the heat resistant tube, the tube seal having a lumen;

wherein the assembly has a proximal end and a distal end, the tube seal is proximal to the distal end of the assembly;

inserting the distal end of the assembly into the heat resistant tube such that the tube seal abuts the layer of plasma gel; and advancing the assembly into the heat resistant tube until all of the plasma gel layer is transferred into the hollow interior of the syringe barrel via the lumen of the tube seal and the lumen in the barrel tip.

Example 2: The method of Example 1, wherein the assembly further comprises an elongate transfer tube having a proximal end and a distal end and a lumen extending therebetween, the elongate transfer tube having on the proximal end a Luer-compatible female taper, the tube seal is mounted onto the distal end of the elongate transfer tube, the distal end of the barrel is connected to the proximal end of the transfer tube.

Example 3: The method of Example 2, wherein the elongate transfer tube includes a male taper on a distal end thereof.

Example 4: The method of Example 3, wherein the male taper on a distal end of the elongate transfer tube is Luer-compatible.

Example 5: The method of Example 1, wherein after the step of inserting the distal end of the assembly and prior to the step of advancing the assembly, de-airing the assembly 800, 800'.

Example 6: The method of Example 5, wherein de-airing the assembly 800 comprises disengaging the syringe barrel from the tube seal, leaving the tube seal in abutment with the plasma gel layer, advancing the syringe plunger to push air out of the hollow interior of the syringe barrel, and re-engaging the syringe barrel tip with the lumen of the tube seal.

Example 7: The method of Example 2, wherein after the step of inserting the distal end of the assembly 800' and prior to the step of advancing the assembly, de-airing the assembly.

Example 8: The method of Example 7, wherein de-airing the assembly 800' comprises disconnecting the syringe barrel from the transfer tube, leaving the transfer tube with the tube seal in abutment with the plasma gel layer, advancing the syringe plunger to push air out of the hollow interior of the syringe barrel, and reconnecting the distal end of the syringe barrel to the proximal end of the transfer tube.

Example 9: The method of Example 1, wherein the step of advancing the assembly into the heat resistant tube is performed without manipulating the syringe plunger.

BRIEF DESCRIPTION OF THE INVENTION

FIG. 1 flow diagram of a conventional method for creating plasma gel;

FIG. 2 flow diagram of an improved method for creating plasma gel;

FIG. 9A shows the assembly 800 inserted (distal end first) into the collection tube such that the tube seal abuts the plasma gel layer;

FIG. 9B shows the assembly 800' inserted (distal end first) into the collection tube such that the tube seal abuts the plasma gel layer;

DETAILED DESCRIPTION

Disclosed is an improved method for creating plasma gel. One of the benefits of the improved method is eliminating the need for a needle and another benefit is eliminating the need for a heat resistant syringe. As described above, the conventional method for creating plasma gel entails heating the liquid plasma in a heat resistant syringe. Heat resistant syringes are not very common and are significantly more expensive than the typical non-heat resistant syringes. The improved method of the present invention, requires the use of a heat resistant collection tube, instead. Heat resistant collection tubes are very common, and significantly less expensive than heat resistant syringes. Disclosed herein is a method for withdrawal of gelled (denatured) plasma (e.g., plasma gel) from a collection tube which overcomes the problems described above with reference to aspirating gelled plasma using a syringe.

Figure 3:
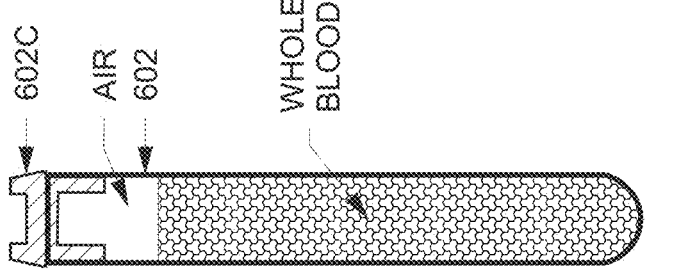
FIG. 3 is a collection tube containing a sample of blood.

FIG. 3 depicts a collection tube 602 containing a sample of whole blood and air. The collection tube 602 is sealed with a cap 602C during the centrifuging.

Figure 1:
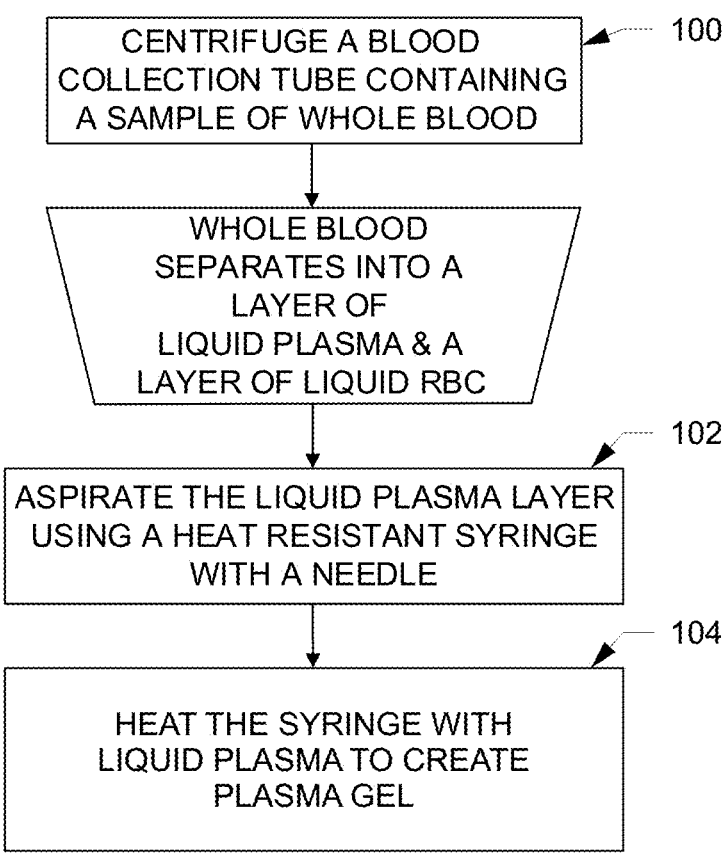
Figure 2:
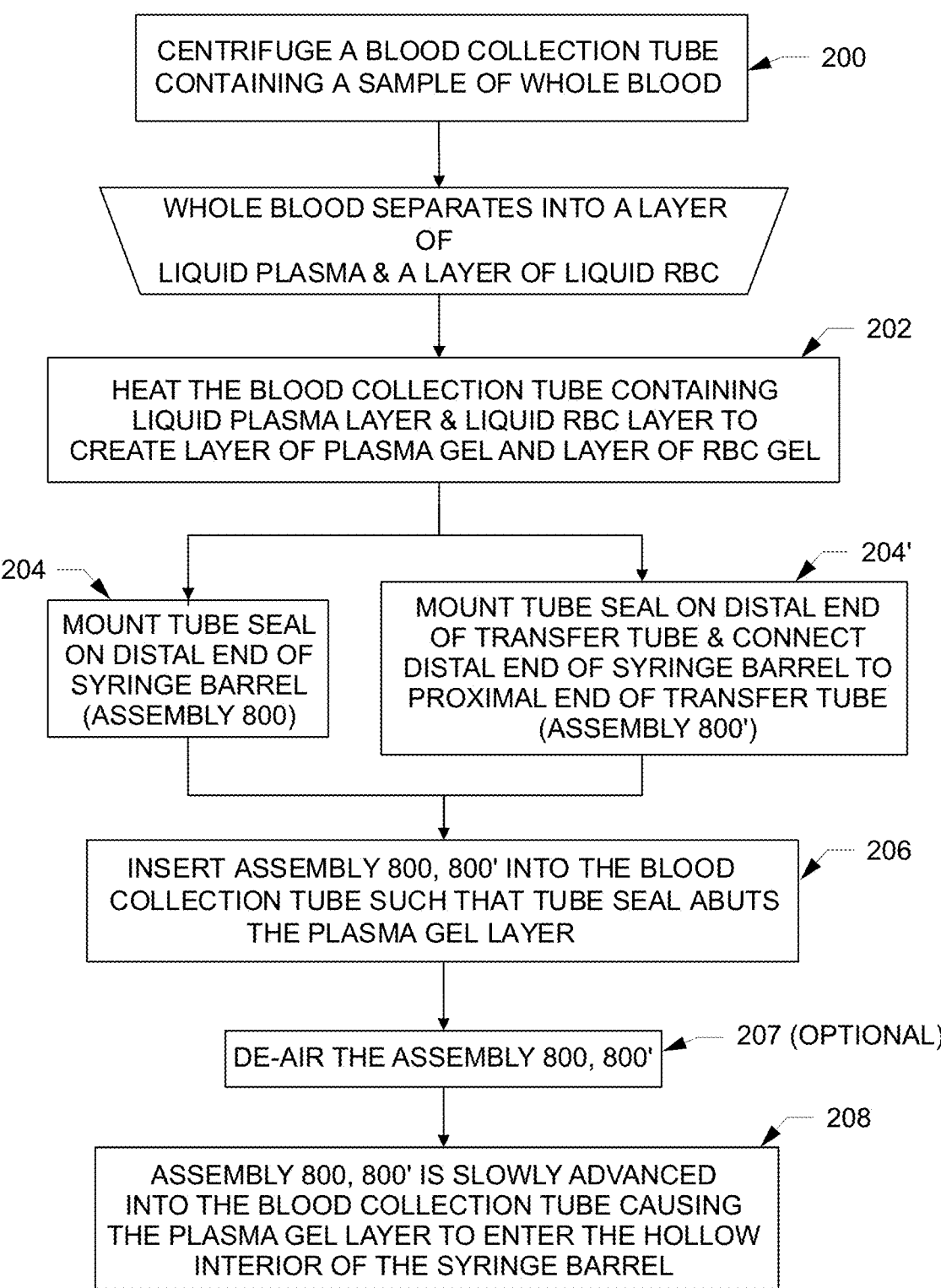

The method of the invention will be described with reference to FIG. 2. In step 200, a sample of whole blood in a collection tube 602 (FIG. 3) is centrifuged such that the sample of whole blood is separated into its constituent components; namely, a layer of liquid plasma and a layer of liquid red blood cells. The collection tube 602 of the present invention must be heat resistant.

Figure 4:
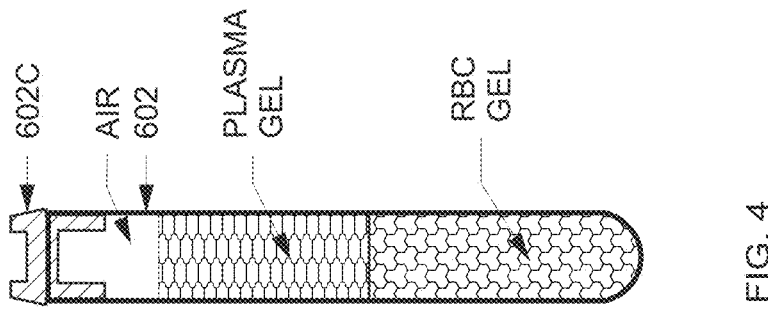
FIG. 4 is the collection tube of FIG. 3 after it has been centrifuged and heated to create a layer of plasma gel and a layer of red blood cell gel.

In step 202, the layer of plasma and the layer of red blood cells are both denatured by heating the collection tube 602 to between 167 degrees Fahrenheit and 212 degrees Fahrenheit (between 75 and 100 degrees Celsius) typically for 5-20 minutes. See FIG. 4.

Figure 5:
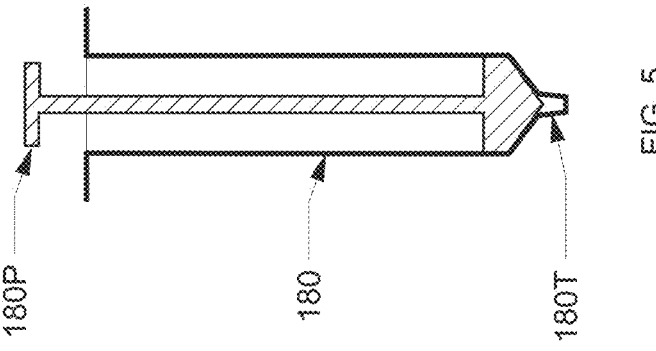
FIG. 5 is a conventional syringe.

FIG. 5 depicts a conventional syringe 180 (not heat resistant). A conventional syringe 180 has a barrel and a plunger 180P movably seated within the barrel. The barrel is generally cylindrical and has a hollow interior for accommodating the plunger. The proximal end of the barrel has an enlarged opening and the distal end of the barrel tapers to a narrow opening 180T. One or more flanges may be provided on an exterior surface of the barrel near the proximal end.

Figure 6:
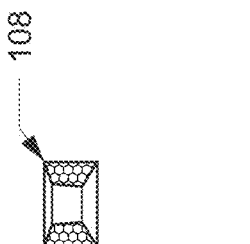
FIG. 6 is a tube seal.

FIG. 6 depicts a tube seal 108. The tube seal 108 is an elastomeric member having a longitudinal axis, a proximal end, a distal end, and a through-hole (lumen) extending therebetween. The tube seal 108 has a proximal face and a distal face. The through-hole (lumen) has a diameter sized to snugly receive the distal tip of the syringe barrel or the distal tip of the transfer tube which (may) have the same dimensions. The outer diameter of the tube seal is sized to create an interference fit with the inner diameter of the collection tube such that a fluid tight seal is created when the tube seal is inserted into the collection tube.

The distal face of the tube seal 108 is the face which is intended to be placed in contact with the plasma gel and may optionally have a funnel-like or concave shape which acts as a funnel directing the plasma into the lumen at the tip 180T on the distal end of the syringe barrel or the distal tip of the transfer tube 700.

The proximal face of the tube seal 108 may or may not have a conical face.

Figure 7:
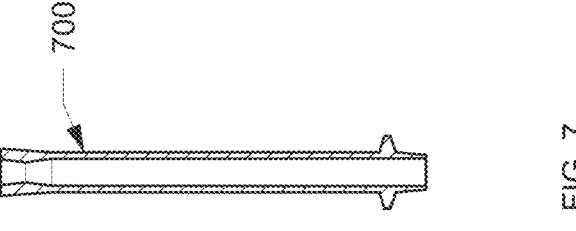
FIG. 7 is a transfer tube used to facilitate the transfer of plasma gel.

FIG. 7 depicts a transfer tube 700 which is an elongate tube having proximal and distal ends with a lumen extending the full length (i.e., from proximal end to distal end) of the transfer tube. The transfer tube 700 is provided with a Luer compatible female taper on the proximal end. The distal end of the transfer tube 700 may optionally include a male taper. In some cases, the male taper may be Luer compatible.

Figure 8A:
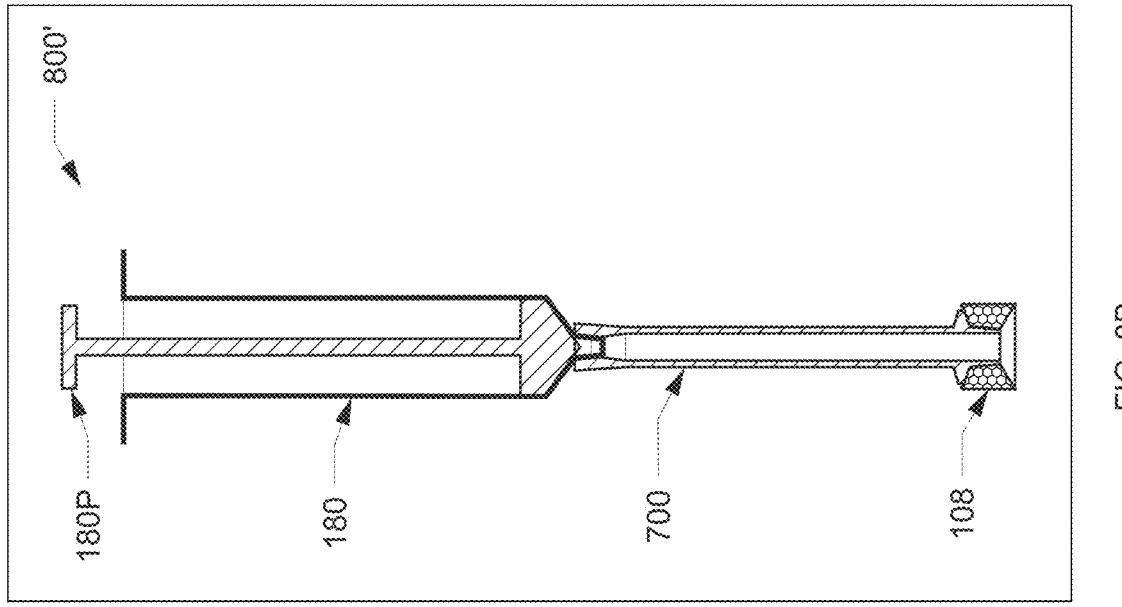
FIG. 8A shows the tube seal of FIG. 6 mounted on a distal end of the syringe (assembly 800)

FIG. 8A shows a tube seal 108 mounted on the distal end 180T of the syringe barrel.

In step 204 the tube seal 108 is mounted on the distal end 180T of the syringe barrel 180. For ease of explanation, we will henceforth refer to the syringe 180 with the tube seal (FIG. 8A) as assembly 800. The tube seal 108 is proximal to the distal end of assembly 800.

Figure 8B:
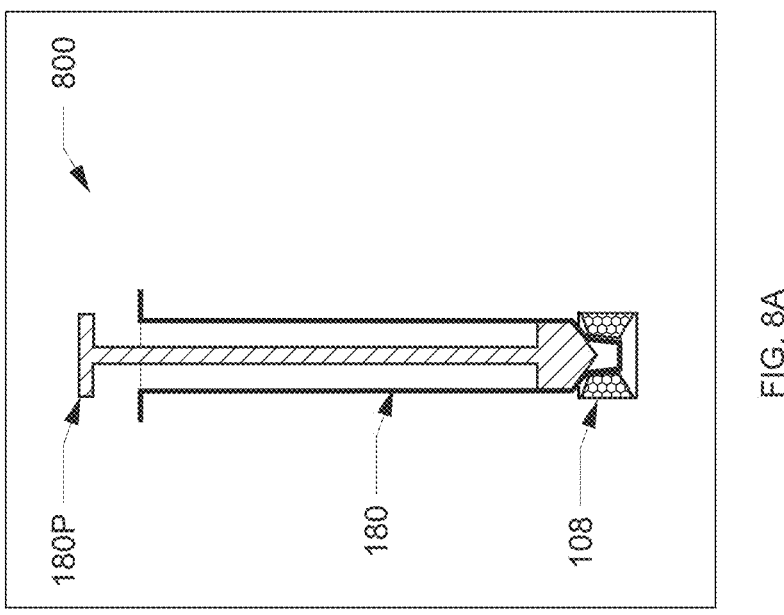
FIG. 8B shows the tube seal of FIG. 6 mounted on a distal end of the transfer tube connected to a syringe (assembly 800')

In step 204' the tube seal 108 is mounted on the distal end of the transfer tube 700, and the distal end 180T of the syringe barrel 180 is connected to the proximal end of the transfer tube 700. See, FIG. 8B.

For ease of explanation, we will henceforth refer to the syringe 180 connected to the transfer tube 700 and the tube seal 108 (FIG. 8B) as assembly 800'. The tube seal 108 is proximal to the distal end of assembly 800'.

In step 206, the distal end of assembly 800, 800' is inserted into the collection tube 602 such that the tube seal 108 abuts the plasma gel layer. See FIG. 9A, 9B.

Figures 10A, 10B:
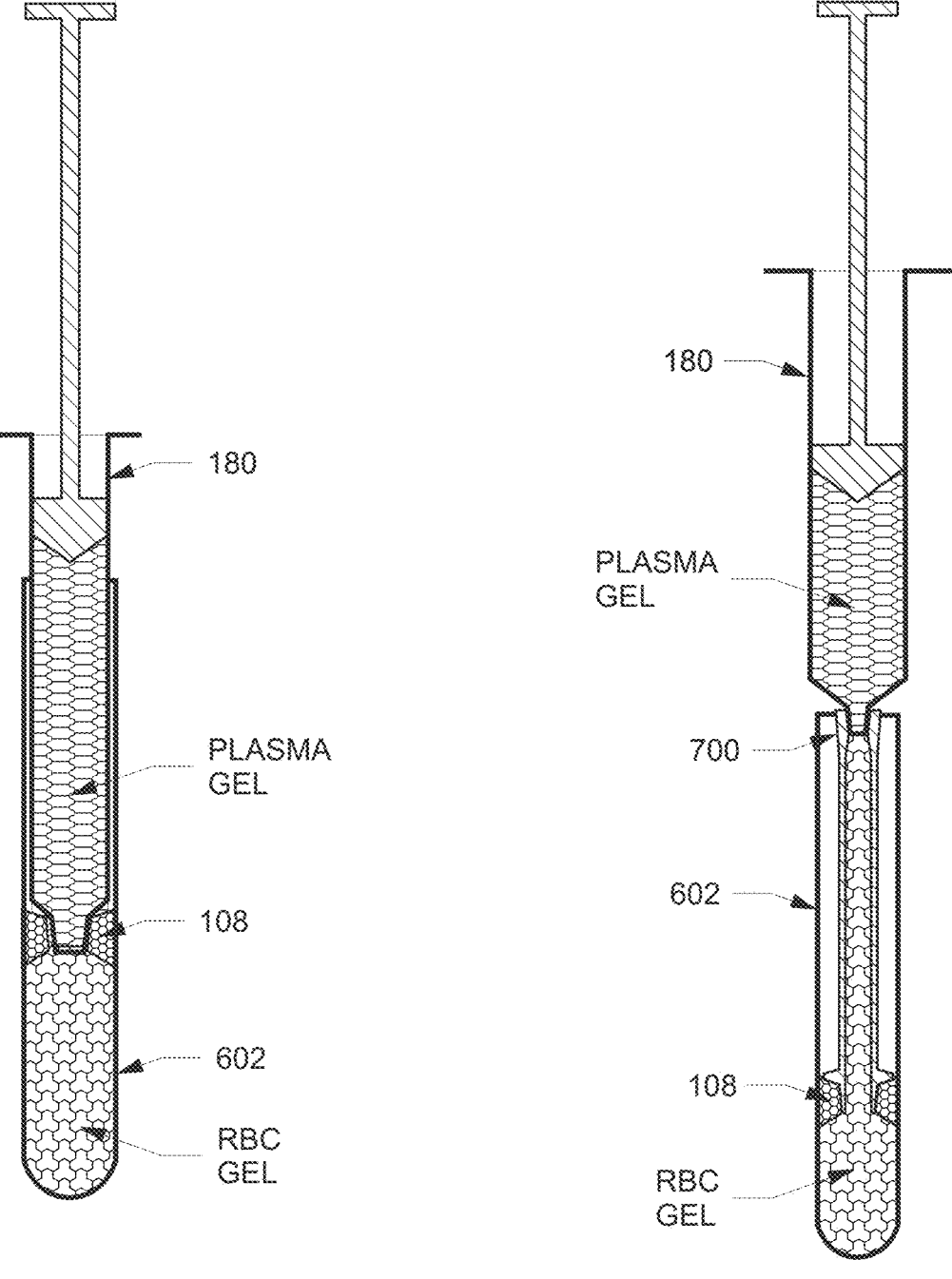
FIG. 10A shows the assembly 800 with the plasma gel layer transferred into the syringe.
FIG. 10B shows the assembly 800' with the plasma gel layer transferred into the syringe.

In step 208, the assembly 800, 800' is slowly advanced into the collection tube 602 causing the plasma gel layer to enter the hollow interior of the syringe barrel 180. See FIGS. 10A, 10B.

Optional step 207 is de-airing of the assembly 800, 800'.

De-airing of assembly 800 is accomplished by dis-engaging the syringe 180 from the tube seal 108, leaving the tube seal 108 in abutment with the plasma gel layer, advancing the syringe plunger 180P towards the distal end of the syringe barrel to push out any air within the hollow interior of the syringe barrel, and re-engaging the syringe 180 with the lumen of the tube seal 108.

De-airing of assembly 800' is accomplished by disconnecting the syringe 180 from the proximal end of the transfer tube 700, leaving the transfer tube 700 and the tube seal 108 in abutment with the plasma gel layer, advancing the syringe plunger 180P towards the distal end of the syringe barrel to push out any air within the hollow interior of the syringe barrel, and reconnecting the distal end of the syringe barrel to the proximal end of the transfer tube.

The advantage of using the transfer tube 700 is that it enables the user to see the denatured red blood cells before they enter into the syringe 180. It also allows the usage of different sizes of syringes. Notably, it allows the use of larger diameter syringes which would not fit into the collection tube.

One of ordinary skill in the art will appreciate that step 207 (de-airing step) is optional and may be omitted.

One of ordinary skill in the art will appreciate that there are other minor variations on the process described above which fall within the spirit of the invention.

While the exemplary embodiments have been described in some detail, by way of example and for clarity of understanding, those of skill in the art will recognize that a variety of modifications, adaptations, and changes may be employed. The scope of the present invention may be limited solely by the appending claims.

The invention claimed is:

1. A method for preparing an injectable plasma gel from a sample of centrifuged blood, comprising:

providing a heat resistant tube containing a sample of whole blood which has been centrifuged to form a plasma layer and a red blood cell layer, the heat resistant tube having an inner diameter;

heating the heat resistant tube to between 167 degrees Fahrenheit and 212 degrees Fahrenheit for 5-20 minutes creating a layer of denatured plasma and a layer of denatured red blood cells;

providing an assembly including:

a syringe having a barrel and a plunger movably seated within the barrel, the barrel is generally cylindrical and has a hollow interior for accommodating the plunger, a proximal end of the barrel has an enlarged opening and a distal end of the barrel tapers to a tip having a lumen in fluid communication with the hollow interior, the plunger at least partially inserted into the barrel of the syringe; and a tube seal mounted on the distal end of the barrel, the tube seal having an outer diameter which closely approximates the inner diameter of the heat resistant tube, the tube seal having a lumen;

wherein the assembly has a proximal end and a distal end, the tube seal is proximal to the distal end of the assembly;

inserting the distal end of the assembly into the heat resistant tube such that the tube seal abuts the layer of denatured plasma; and advancing the assembly into the heat resistant tube until all of the denatured plasma layer is transferred into the hollow interior of the syringe barrel via the lumen of the tube seal and the lumen in the barrel tip;

wherein the assembly further comprises an elongate transfer tube having a proximal end and a distal end and a lumen extending therebetween, the elongate transfer tube having on the proximal end a Luer-compatible female taper, the tube seal is mounted onto the distal end of the elongate transfer tube, the distal end of the barrel is connected to the proximal end of the transfer tube.

2. The method of claim 1, wherein the elongate transfer tube includes a male taper on a distal end thereof.

3. The method of claim 2, wherein the male taper on a distal end of the elongate transfer tube is Luer-compatible.

4. The method of claim 1, wherein after the step of inserting the distal end of the assembly and prior to the step of advancing the assembly, there is an additional step of de-airing the assembly.

5. The method of claim 4, wherein de-airing the assembly comprises disengaging the syringe barrel from the tube seal, leaving the tube seal in abutment with the denatured plasma layer, advancing the syringe plunger to push air out of the hollow interior of the syringe barrel, and re-engaging the syringe barrel tip with the lumen of the tube seal.

6. The method of claim 1, wherein after the step of inserting the distal end of the assembly and prior to the step of advancing the assembly, there is an additional step of de-airing the assembly.

7. The method of claim 6, wherein de-airing the assembly comprises disconnecting the syringe barrel from the transfer tube, leaving the transfer tube with the tube seal in abutment with the denatured plasma layer, advancing the syringe plunger to push air out of the hollow interior of the syringe barrel, and reconnecting the distal end of the syringe barrel to the proximal end of the transfer tube.

8. The method of claim 1, wherein the step of advancing the assembly into the heat resistant tube is performed without manipulating the syringe plunger.

* * * * *